US010068089B1

(12) United States Patent
Shavell et al.

(10) Patent No.: US 10,068,089 B1
(45) Date of Patent: Sep. 4, 2018

(54) SYSTEMS AND METHODS FOR NETWORK SECURITY

(71) Applicant: Symantec Corporation, Mountain View, CA (US)

(72) Inventors: Michael Shavell, Merrimack, NH (US); Matt Boucher, Merrimack, NH (US); Kevin Jiang, Wiltham, MA (US)

(73) Assignee: Symantec Corporation, Mountain View, CA (US)

( * ) Notice: Subject to any disclaimer, the term of this patent is extended or adjusted under 35 U.S.C. 154(b) by 73 days.

(21) Appl. No.: 14/864,947

(22) Filed: Sep. 25, 2015

(51) Int. Cl.
| | |
|---|---|
| *G06F 21/55* | (2013.01) |
| *H04L 29/06* | (2006.01) |
| *H04W 12/00* | (2009.01) |
| *G06F 21/57* | (2013.01) |
| *H04W 12/12* | (2009.01) |

(52) U.S. Cl.
CPC .......... *G06F 21/554* (2013.01); *G06F 21/577* (2013.01); *H04L 63/0272* (2013.01); *H04L 63/1433* (2013.01); *H04L 63/1466* (2013.01); *H04W 12/00* (2013.01); *H04W 12/12* (2013.01)

(58) Field of Classification Search
CPC . G06F 21/577; G06F 21/554; H04L 63/0272; H04L 63/1433; H04L 63/1466; H04W 12/12; H04W 12/00
See application file for complete search history.

(56) References Cited

U.S. PATENT DOCUMENTS

| 6,553,378 B1* | 4/2003 | Eschelbeck | G06F 11/0748 |
| 7,336,670 B1* | 2/2008 | Calhoun | H04L 63/10 370/252 |
| 7,885,639 B1* | 2/2011 | Satish | H04L 9/32 455/410 |
| 8,074,279 B1* | 12/2011 | Lin | H04W 12/08 709/243 |

(Continued)

OTHER PUBLICATIONS

C. Lesjak et al., "Securing smart maintenance services: Hardware-security and TLS for MQTT," 2015 IEEE 13th International Conference on Industrial Informatics (INDIN), Cambridge, 2015, pp. 1243-1250.*

(Continued)

*Primary Examiner* — Kari L Schmidt
(74) *Attorney, Agent, or Firm* — FisherBroyles, LLP

(57) ABSTRACT

A computer-implemented method for network security may include (1) obtaining initial information that at least partially identifies an initial access point for connecting to a network, (2) after obtaining the initial information, obtaining subsequent information that at least partially identifies a subsequent access point for connecting to the same network, (3) comparing, by a security program, the initial information and the subsequent information in an attempt to detect whether the initial access point and the subsequent access point are the same, (4) detecting, based on the comparison, an indication that the initial access point and the subsequent access point are different, and (5) performing, by the security program in response to detecting the indication that the initial access point and the subsequent access point are different, a remedial action to protect a user. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2005/0060576 A1* | 3/2005 | Kime | .................. | H04L 63/1425 726/4 |
| 2006/0068811 A1* | 3/2006 | Adya | .................... | H04W 12/12 455/456.2 |
| 2007/0183375 A1* | 8/2007 | Tiwari | .................. | H04L 63/101 370/338 |
| 2009/0094351 A1* | 4/2009 | Gupta | .................. | H04L 63/104 709/220 |
| 2013/0019298 A1* | 1/2013 | Jover Segura | ........ | H04L 63/101 726/7 |
| 2013/0097710 A1* | 4/2013 | Basavapatna | ........... | H04W 4/02 726/25 |
| 2013/0097711 A1* | 4/2013 | Basavapatna | ........... | H04W 4/02 726/25 |
| 2014/0250533 A1* | 9/2014 | Basavapatna | ........... | H04W 4/02 726/25 |
| 2014/0317270 A1* | 10/2014 | Besehanic | .............. | H04H 60/32 709/224 |
| 2015/0106921 A1* | 4/2015 | Shaulov | ................ | H04W 12/12 726/22 |
| 2015/0334569 A1* | 11/2015 | Rangarajan | ........... | H04W 12/12 726/4 |
| 2016/0112450 A1* | 4/2016 | Basavapatna | ........... | H04W 4/02 726/23 |
| 2016/0164889 A1* | 6/2016 | Zhang | .................. | H04W 12/12 726/23 |

OTHER PUBLICATIONS

Danev, Boris, Davide Zanetti, and Srdjan Capkun. "On physical-layer identification of wireless devices." ACM Computing Surveys (CSUR) 45.1 (2012): 6.*

Roth, Volker, et al. "Simple and effective defense against evil twin access points." Proceedings of the first ACM conference on Wireless network security. ACM, 2008, pp. 220-235.*

"WiFi Pineapple", https://www.wifipineapple.com/, as accessed Sep. 2, 2015, (Sep. 26, 2011).

* cited by examiner

SYSTEMS AND METHODS FOR NETWORK SECURITY

BACKGROUND

Individuals and organizations typically seek to protect their computing resources from malicious attacks and intrusions. These attacks may occur in a variety of ways. In some examples, attackers may transmit an email or other message to a target in an attempt to infect the target with malware. In additional examples, attackers may attempt to overcome one or more security barriers, such as firewalls and password protection mechanisms, to gain access to private or sensitive information.

In one specific example, attackers may attempt to compromise the security of a wireless network. These attackers may use a wireless network device, such as a WI-FI PINEAPPLE device, to receive, intercept, and/or forward wireless network traffic. Traditional network security mechanisms may fail to optimally protect users from attacks that use wireless network devices, such as PINEAPPLE devices, in this manner. Accordingly, the instant disclosure identifies and addresses a need for additional and improved systems and methods for network security.

SUMMARY

As will be described in greater detail below, the instant disclosure generally relates to systems and methods for protecting computer networks by, for example, automatically scanning, analyzing, and detecting any indications that a wireless access point has changed since a previous connection to the corresponding wireless network by the same client device or another client device. In one example, a computer-implemented method for network security may include (1) obtaining initial information that at least partially identifies an initial access point for connecting to a network, (2) after obtaining the initial information, obtaining subsequent information that at least partially identifies a subsequent access point for connecting to the same network, (3) comparing, by a security program, the initial information and the subsequent information in an attempt to detect whether the initial access point and the subsequent access point are the same, (4) detecting, based on the comparison, an indication that the initial access point and the subsequent access point are different, and (5) performing, by the security program in response to detecting the indication that the initial access point and the subsequent access point are different, a remedial action to protect a user, the remedial action including at least one of warning the user and increasing a security risk score.

In one embodiment, the network may include a wireless network. The initial access point and the subsequent access point may include wireless access points.

In further embodiments, detecting, based on the comparison, the indication that the initial access point and the subsequent access point are different may include detecting an indication that a manufacturer for the initial access point and a manufacturer for the subsequent access point are different.

In one embodiment, detecting, based on the comparison, the indication that the initial access point and the subsequent access point are different may include detecting an indication that a media access control number for the initial access point and a media access control number for the subsequent access point are different.

In further embodiments, detecting, based on the comparison, the indication that the initial access point and the subsequent access point are different may include detecting an indication that a field of an initial network packet transmitted by the initial access point specifies a value that differs from a same field of a subsequent network packet transmitted by the subsequent access point. The field of the initial network packet and the field of the subsequent network packet may be located at the data link layer of the open systems interconnection model.

In one embodiment, the field specifies at least one hardware capability supported by a corresponding access point. Detecting, based on the comparison, the indication that the initial access point and the subsequent access point are different may include detecting an indication that hardware capabilities supported by the initial access point and hardware capabilities supported by the subsequent access point are different.

In further embodiments, detecting, based on the comparison, the indication that the initial access point and the subsequent access point are different may include detecting an indication that an identity of a wireless radio of the initial access point and an identity of a wireless radio of the subsequent access point are different.

In one embodiment, obtaining the subsequent information is performed by a different client than a client that obtained the initial information and at least one of the initial information and the subsequent information is uploaded to a centralized backend security server of a software security product vendor for aggregating telemetry information from different client devices in a field of client devices corresponding to separate purchases of the security program. In further embodiments, at least one of the initial information and the subsequent information is obtained from a web configuration homepage for configuring a corresponding access point.

In one embodiment, a system for implementing the above-described method may include (1) an obtaining module, stored in memory, that (A) obtains initial information that at least partially identifies an initial access point for connecting to a network and (B) after obtaining the initial information, obtains subsequent information that at least partially identifies a subsequent access point for connecting to the same network, (2) a comparison module, stored in memory, that compares, as part of a security program, the initial information and the subsequent information in an attempt to detect whether the initial access point and the subsequent access point are the same, (3) a detection module, stored in memory, that detects, based on the comparison, an indication that the initial access point and the subsequent access point are different, (4) a performance module, stored in memory, that performs, as part of the security program in response to detecting the indication that the initial access point and the subsequent access point are different, a remedial action to protect a user, the remedial action including at least one of warning the user and increasing a security risk score, and (5) at least one physical processor configured to execute the obtaining module, the comparison module, the detection module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) obtain initial information that at least partially identifies an initial access point for connecting to a network, (2) after obtaining the initial information, obtain subsequent information that at least partially identifies a subsequent access point, (3) compare, by a security program, the initial information and the subsequent information in an attempt to detect whether the initial access point and the subsequent access point are the same, (4) detect, based on the comparison, an indication that the initial access point and the subsequent access point are different, and (5) perform, by the security program in response to detecting the indication that the initial access point and the subsequent access point are different, a remedial action to protect a user, the remedial action including at least one of warning the user and increasing a security risk score.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
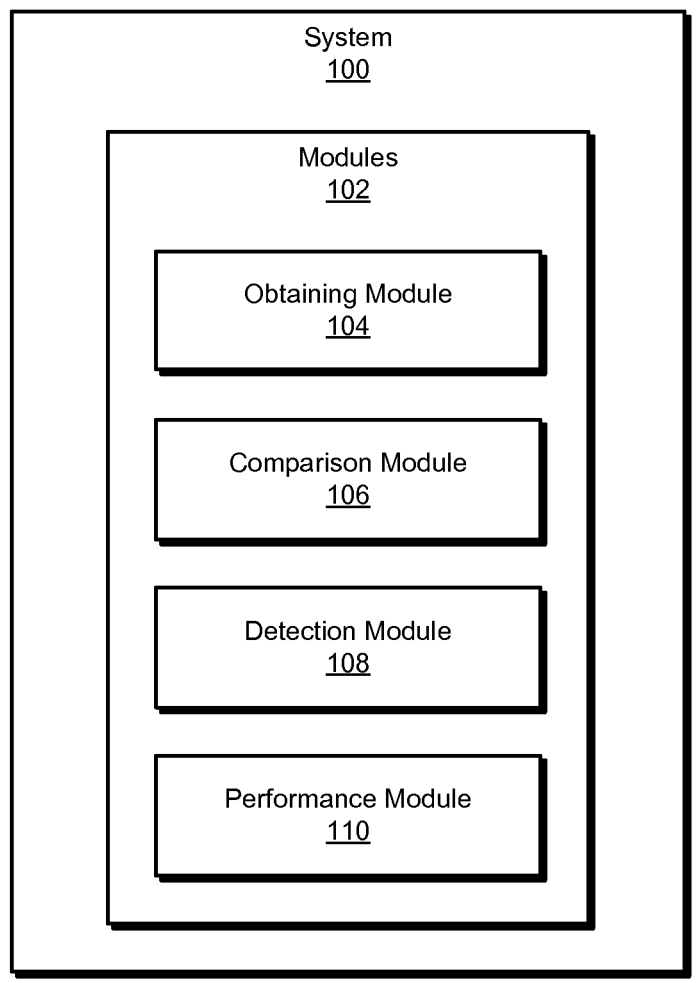
FIG. 1 is a block diagram of an exemplary system for network security.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for network security. As will be explained in greater detail below, the disclosed systems and methods may improve the accuracy and usefulness of network security technology by notifying users, administrators, and/or security software programs of potential changes in wireless access points that may indicate that the wireless network is compromised. Even when the disclosed systems and methods do not provide a guaranteed assurance that the wireless access point has changed or that the network is truly compromised, the systems may nevertheless warn users of the potential danger and also adjust or increase corresponding security risk scores, as discussed further below.

Figure 2:
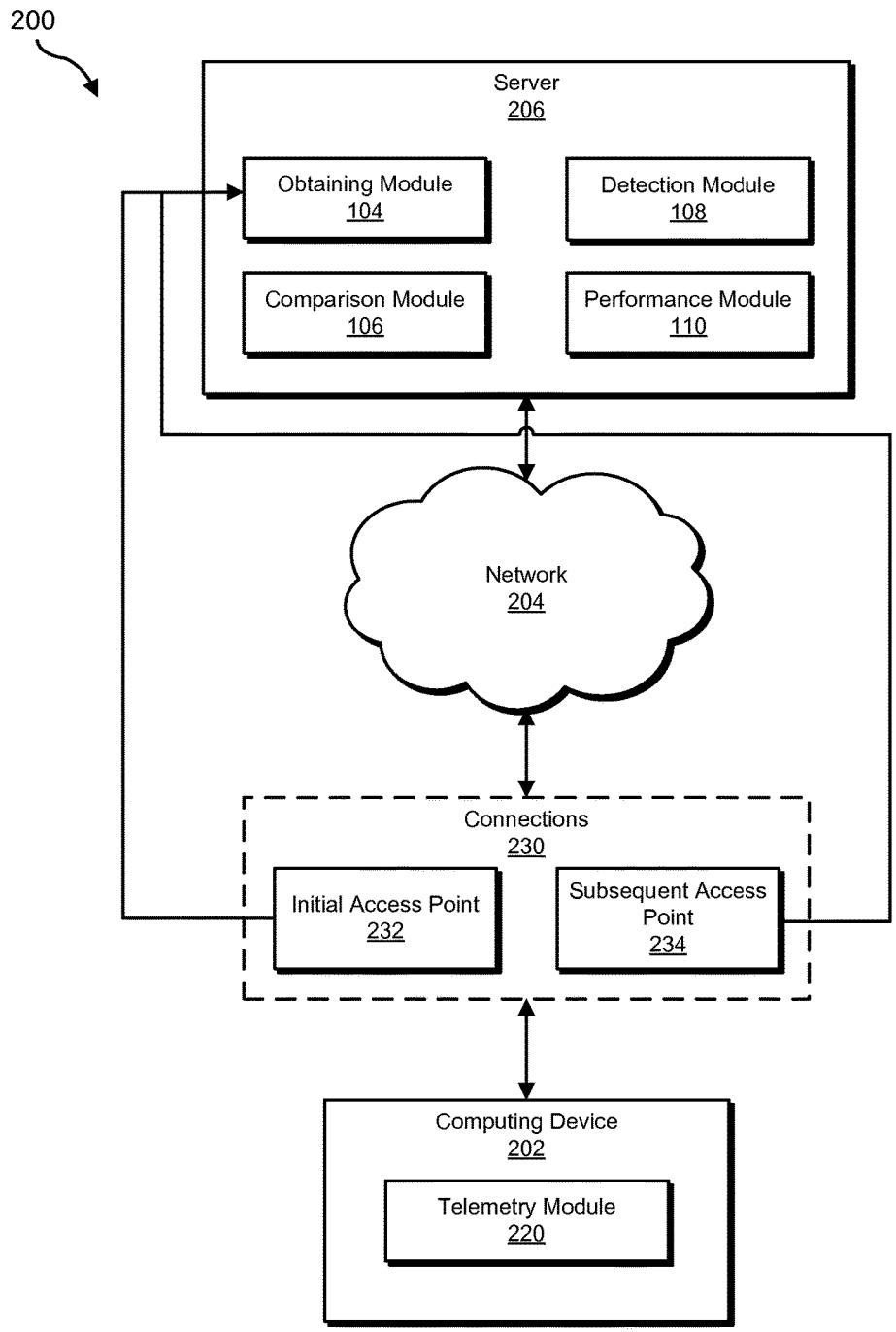
FIG. 2 is a block diagram of an additional exemplary system for network security.

The following will provide, with reference to FIGS. 1-2, detailed descriptions of exemplary systems for network security. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for network security. As illustrated in this figure, exemplary system 100 may include one or more modules 102 for performing one or more tasks. For example, and as will be explained in greater detail below, exemplary system 100 may also include an obtaining module 104 that may obtain initial information that at least partially identifies an initial access point for connecting to a network. Obtaining module 104 may also obtain subsequent information that at least partially identifies a subsequent access point for connecting to the network. Exemplary system 100 may additionally include a comparison module 106 that may compare, as part of a security program, the initial information and the subsequent information in an attempt to detect whether the initial access point and the subsequent access point are the same. Exemplary system 100 may also include a detection module 108 that may detect, based on the comparison, an indication that the initial access point and the subsequent access point are different. Exemplary system 100 may additionally include a performance module 110 that may perform, as part of the security program in response to detecting the indication that the initial access point and the subsequent access point are different, a remedial action to protect a user. The remedial action may include at least one of warning a user and increasing a security risk score. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to protect users from network security threats. For example, and as will be described in greater detail below, obtaining module 104 may obtain initial information that at least partially identifies an initial access point 232 for connecting to a network 204 (e.g., within connections 230). Obtaining module 104 may also obtain subsequent information that at least partially identifies a subsequent access point 234 for connecting to network 204. Comparison module 106 may compare, as part of a security program, the initial information and the subsequent information in an attempt to detect whether initial access point 232 and subsequent access point 234 are the same. Detection module 108 may detect, based on the comparison, an indication that initial access point 232 and subsequent access point 234 are different. Performance module 110 may perform, as part of the security program in response to detecting the indication that initial access point 232 and subsequent access point 234 are different, a remedial action to protect a user. The remedial action may include at least one of warning the user and increasing a security risk score. Notably, system 200 may also include a telemetry module 220 within computing device 202, which may transmit access point identifying information to (and/or receive access point identifying information from) a centralized backend security server of a security product vendor (e.g., server 206), as discussed further below.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of facilitating a network security system for protecting computing resources. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
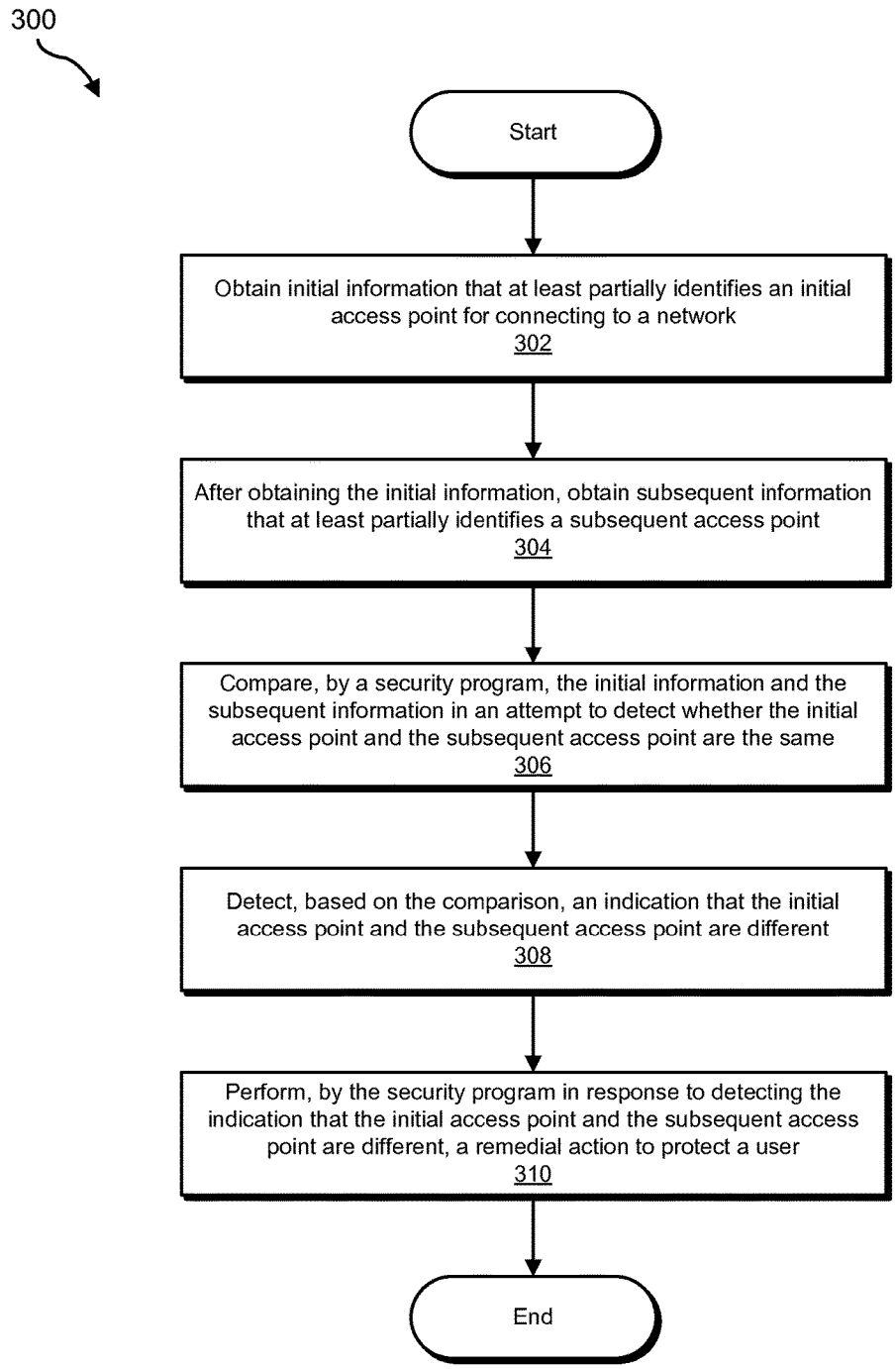
FIG. 3 is a flow diagram of an exemplary method for network security.

FIG. 3 is a flow diagram of an exemplary computer-implemented method 300 for network security. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may obtain initial information that at least partially identifies an initial access point for connecting to a network. For example, obtaining module 104 may, as part of server 206 in FIG. 2, obtain initial information that at least partially identifies initial access point 232 for connecting to network 204.

As used herein, the term "information that at least partially identifies" an access point generally refers to any information that fully or partially enables a security system to distinguish between whether an access point for connecting to a wireless network at one time is the same as an access point used for connecting to the same wireless network at an earlier time. Moreover, as used herein, the term "access point" generally refers to a network device that functions as a point of entry to the corresponding network.

Obtaining module 104 may obtain the initial information that at least partially identifies the access point in a variety of ways. In some examples, the network includes a wireless network. Similarly, the initial access point may include a wireless access point. In further examples, the initial access point may include a wireless network router.

In some examples, the initial information that at least partially identifies the access point may include an identifier of the access point. In general, the initial information may specify or describe an attribute of the access point. The attribute may constitute a fixed, unchanging, hardware-level, hardwired, and/or other characteristic as distinct from a temporary, fleeting, and/or configurable characteristic. In some examples, the initial information may specify a media access control number. In further examples, the initial information may specify a manufacturer of the access point. Notably, a prefix or other portion of the media access control number may be assigned to the manufacturer and thereby indicate the identity of the manufacturer. In additional examples, the initial information may constitute the device identifier or private key embedded within a crypto-processor within the access point.

In one embodiment, obtaining module 104 may obtain the initial information in response to interrogating the initial access point. For example, obtaining module 104 may transmit a request for the initial information to the initial access point. In some examples, obtaining module 104 may execute an "nmapp" command on the initial access point as a host. In these examples, the result of executing the command may reveal which ports the access point maintains as open or closed. Notably, from among hundreds or thousands of ports, the pattern of open and closed ports may effectively function as a fingerprint, or partial fingerprint, for the manufacturer of the initial access point. Accordingly, by analyzing the pattern of open and closed ports revealed by the execution of the command, obtaining module 104 may obtain an indication of the manufacturer of the initial access point. In further examples, the initial information may identify the radio within the wireless access point (i.e., identify the specific radio within the access point as distinct from the access point itself).

In additional examples, the initial information may indicate hardware or software functionality supported by the initial access point. Obtaining module 104 may obtain the indication of the functionality supported by the initial access point from a wireless network packet transmitted by the initial access point. For example, the network packet may include a field that specifies one or more values or flags indicating hardware and/or software functionality supported by the initial access point. In other examples, obtaining module 104 may obtain the initial information by analyzing or categorizing a format or structure of a network frame, such as a frame formatted according to the TCP/IP protocol, which may at least partially identify the access point or its operating system.

In further examples, obtaining module 104 may obtain the initial information from a web configuration homepage for configuring the initial access point. For example, obtaining module 104 may navigate to the web configuration homepage and then scrape (e.g., parse HTML) the web configuration homepage or portal for information that indicates the UNIFORM RESOURCE LOCATOR, domain name, firmware identifier or version, manufacturer, media access control number, model number, serial number, opened and/or closed ports, supported hardware and/or software functionality or protocols, or any other suitable identifying information, as outlined above.

Returning to FIG. 3, at step 304, one or more of the systems described herein may obtain subsequent information that at least partially identifies the subsequent access point for connecting to the same network. For example, obtaining module 104 may, as part of server 206 in FIG. 2, obtain subsequent information that at least partially identifies subsequent access point 234 for connecting to network 204.

As used herein, the term "subsequent information" generally refers to information that is obtained after obtaining the initial information. Moreover, as used herein, the subsequent information indicates identifying characteristics or attributes of the access point used for a second connection made to the same network after an original connection from which the initial information was obtained. In other words, the initial information and the subsequent information correspond to two different connections to the same network and provide information about whether the access point used to make these connections is the same or different, as discussed further below.

Notably, initial access point 232 and subsequent access point 234 may generally parallel each other. Similarly, obtaining module 104 may obtain the subsequent information that at least partially identifies the subsequent access point in a manner that generally parallels the manner in which obtaining module 104 obtained the initial information, as outlined above. In some examples, the initial information and the subsequent information will constitute the same type of information (e.g., the media access control number). In other examples, the initial information may correspond to one of the types of information outlined above for step 302 (e.g., the media access control number) while the subsequent information corresponds to another one of the types of information (e.g., the manufacturer specified model number) outlined above for step 302 of method 300.

In some examples, obtaining module 104 may obtain the subsequent information from a different client than a client that originally obtained the initial information. In these examples, one or more of the initial information and the subsequent information may be uploaded (e.g., by telemetry module 220) to a centralized backend security server (e.g., server 206) of a software security product vendor for aggregating telemetry information from different client devices in a field of client devices corresponding to separate purchases of the security program. In these examples, the centralized backend server may index the uploaded telemetry data according to one or more key values that indicate the corresponding access point and/or wireless network (e.g., the SERVICE SET IDENTIFIER and/or password for the wireless network or the location, name, time of connection, and/or other identifying information).

In other words, a software security vendor may centrally aggregate information that identifies access points from different users, households, and/or customers that separately and/or independently purchased the same or compatible software products to enable backend server devices and/or customer client devices to perform comparisons between initial information and subsequent information. In these examples at least one of the initial information and the subsequent information may have been obtained by another customer than the customer currently benefiting from the comparison and detection techniques described herein for method 300. For example, a first customer at one location may perform the first network connection that results in obtaining the initial information. Subsequently, at another time and independent of the first customer, a second customer at the same location may perform the second network connection that results in obtaining the subsequent information.

For example, the software security product may automatically, routinely, and/or according to a predefined schedule upload some or all predefined and obtained items of identifying information for access points to which the client device connects. In parallel, the software security product may automatically, routinely, and/or according to a predefined schedule request one or more items of initial information from server 206 when connecting to a network to perform the comparison and thereby detect whether the access point potentially changed. Additionally, or alternatively, the customer client device may simply request that the server perform the comparison after the customer client device uploads the newly obtained subsequent information (e.g., the comparison and detection may be performed either server-side and/or client-side, and access point identifying information may be both uploaded to the centralized backend security server and/or downloaded from the centralized backend security server to perform comparisons at the receiving network device). Of course, additionally or alternatively, computing device 202 may also cache one or all items of initial information obtained at computing device 202, thereby enabling computing device 202 to perform its own comparisons without referencing a centralized backend security server such as server 206.

Notably, obtaining module 104 may obtain the initial information and/or the subsequent information in response to first establishing the initial network connection and/or the subsequent network connection to the same network. For example, obtaining module 104 may query or investigate the access point in response to establishing the corresponding network connection. Similarly, obtaining module 104 may scan and/or extract the initial information and/or the subsequent information from network packets automatically transmitted by the access point as part of the network handshake to establish the network connection.

Additionally, obtaining module 104 may also translate one type of identifying information into another type of identifying information. For example, obtaining module 104 may translate a media access control number into a manufacturer identifier. Similarly, obtaining module 104 may translate a pattern of open/closed network ports to a manufacturer identifier. Notably, obtaining module 104 may translate one item of initial information that does not correspond to a type of the subsequent information into a different type of information that does correspond to the type of the subsequent information (or vice versa), thereby enabling the disclosed systems and methods to perform the comparison and detection steps of method 300.

At step 306, one or more of the systems described herein may compare, as part of a security program, the initial information and the subsequent information in an attempt to detect whether the initial access point and the subsequent access point are the same. For example, comparison module 106 may, as part of server 206 in FIG. 2, compare the initial information and the subsequent information in an attempt to detect whether the initial access point and the subsequent access point are the same.

Comparison module 106 may compare the initial information and the subsequent information in a variety of ways. In general, comparison module 106 may compare these two items of information according to any analysis or algorithm that tends to indicate whether the access point used to access the corresponding network has changed. In some examples, comparison module 106 may compare one type of initial information (e.g., the media control access number) with the same type of subsequent information. In another example, comparison module 106 may compare one type of initial information (e.g., the media control access number) with a different type of subsequent information (e.g., the pattern of opened and closed ports on the subsequent access point).

In general, comparison module 106 may compare the two items of information in response to obtaining the subsequent information and/or in response to establishing the second network connection from which the subsequent information was obtained. In other words, the disclosed systems and methods may attempt to detect whether a security threat exists and/or whether the access point has changed as soon as possible upon establishing, or attempting to establish, the second network connection to thereby minimize the risk or exposure of the user to compromised networks. Detection module 108 and performance module 110 may perform steps 308 and 310 in a parallel manner (i.e., perform these steps in response to obtaining the subsequent information and/or establishing the second network connection).

In further examples, comparison module 106 may compare a single item of initial information with a single item of subsequent information. In other examples, comparison module 106 may compare a multitude of items of initial information (e.g., corresponding to any permutation or set of the examples of initial information listed above for step 302 of method 300) with a multitude of items of subsequent information (e.g., corresponding to any permutation or set of the examples of subsequent information listed above for step 304 of method 300). Moreover, comparison module 106 may compare a set of items of initial information with a set of items of subsequent information in cases where these two sets of items of information have the same number or different numbers of items of information.

At step 308, one or more of the systems described herein may detect, based on the comparison, an indication that the initial access point and the subsequent access point are different. For example, detection module 108 may, as part of server 206 in FIG. 2, detect, based on the comparison, an indication that the initial access point and the subsequent access point are different.

Detection module 108 may detect the indication that the access point has changed in a variety of ways. In general, detection module 108 may use any business logic, Boolean logic, algebraic logic, weighted or unweighted variable formula, and/or scoring procedure for determining whether these items of information indicate that the access point has changed or potentially changed. For example, detection module 108 may compute a similarity score that indicates similarity between the set of initial information and the set of subsequent information. Detection module 108 may then compare the similarity score with a threshold to determine whether the similarity score satisfies the threshold. The threshold may constitute a security or similarity threshold beyond which a security threat is detected or a candidate security threat is detected and reported.

Moreover, detection module 108 and/or performance module 110 may also correlate a strength, value, and/or proportionality of the remedial action to a strength, value, and/or proportion of the similarity score. In other words, a greater degree of difference between the initial information and the subsequent information may indicate a greater potential security threat and corresponding greater remedial action. Alternatively, detection module 108 may determine that any detected difference between corresponding items of identifying information indicates a candidate security event that triggers the remedial action, as discussed below for step 310 of method 300 (i.e., because the fixed or hardware-level characteristics of the access point should remain static and totally unchanging between different connections to the corresponding network).

Figure 4:
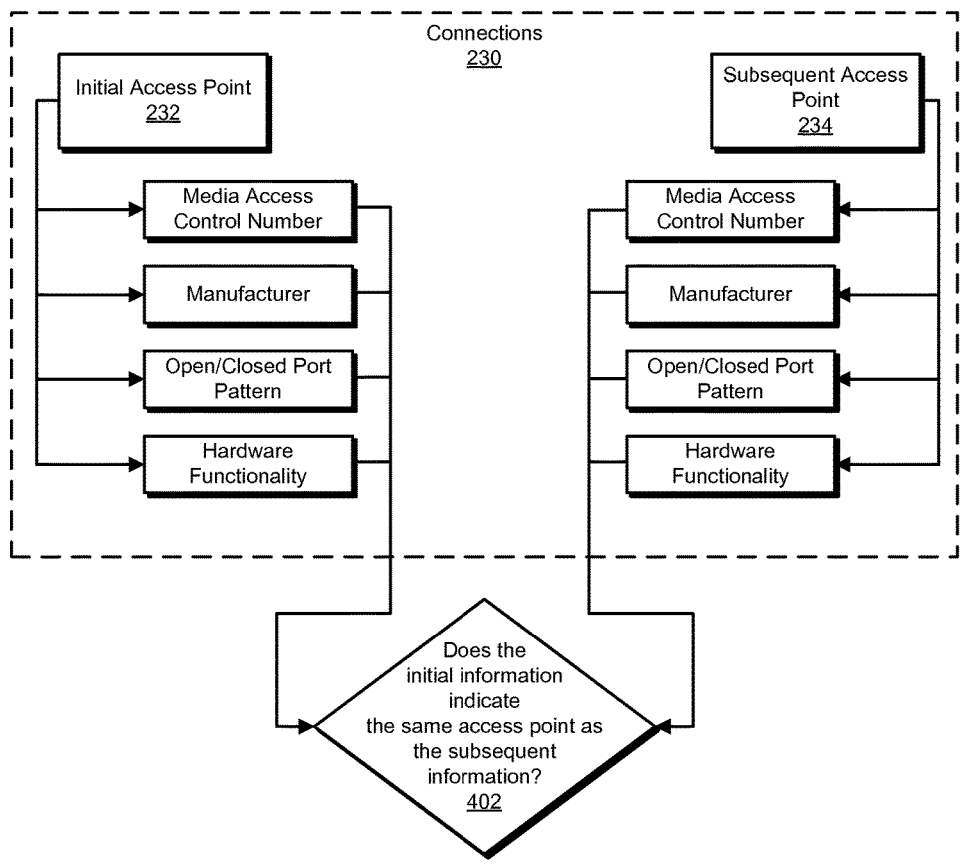
FIG. 4 is a block diagram of an exemplary comparison between items of data for detecting different access points.

FIG. 4 shows a more detailed example of connections 230 corresponding to initial access point 232 and subsequent access point 234. As shown in this figure, obtaining module 104 may obtain one or more items of identifying information from each of the initial access point and the subsequent access point. In the example of this figure, these items of information include the media access control number, the manufacturer, the open/closed port pattern, and hardware functionality. Nevertheless, in other examples, the set of obtained items of information may be different for the initial access point and the subsequent access point. Moreover, either of the sets may include any single one or multiple ones of any of the examples of identifying information listed above for steps 302 and/or 304 of method 300 (e.g., according to any permutation). As further shown in FIG. 4, the obtained items of identifying information may be forwarded to comparison module 106, which may perform the comparison in accordance with step 306, as outlined above. Detection module 108 may then determine whether an indication exists that the access point has changed or has potentially changed, as further outlined above. In the example of FIG. 4, the comparison performed by comparison module 106 and the detection performed by detection module 108 may correspond to decision step 402.

In one embodiment, detection module 108 may detect, based on the comparison, the indication that the initial access point and the subsequent access point are different by detecting an indication that an identity of a wireless radio of the initial access point and an identity of a wireless radio of the subsequent access point are different. In further embodiments, detection module 108 may detect, based on the comparison, the indication that the initial access point and the subsequent access point are different by detecting an indication that a field of an initial network packet transmitted by the initial access point specifies a value that differs from a same field of a subsequent network packet transmitted by the subsequent access point. In some examples, the field specifies at least one hardware capability supported by a corresponding access point. Furthermore, detection module 108 may detect, based on the comparison, the indication that the initial access point and the subsequent access point are different by detecting an indication that hardware capabilities supported by the initial access point and hardware capabilities supported by the subsequent access point are different, as further outlined above. In additional examples, the field of the initial network packet and the field of the subsequent network packet are located at the data link layer of the OPEN SYSTEMS INTERCONNECTION model. In general, obtaining module 104 may obtain any item of metadata, payload data, network packet data, and/or header data that tends to indicate the identity of a transmitting access point and/or indicates any other fixed or semi-fixed attribute of the transmitting access point, as also outlined above.

At step 310, one or more of the systems described herein may perform, in response to detecting the indication that the initial access point and the subsequent access point are different, a remedial action to protect a user. For example, performance module 110 may, as part of server 206 in FIG. 2, perform, in response to detecting the indication that the initial access point and the subsequent access point are different, a remedial action to protect a user. The remedial action may include at least one of warning the user and increasing a security risk score.

As used herein, the term "remedial action" generally refers to any action that a software security system may perform automatically, autonomously, or semi-autonomously to protect users from candidate security threats detected according to step 308, as outlined above. Moreover, as used herein, the term "security risk score" generally refers to any score along a scale that measures a binary or gradient value indicating a degree to which a corresponding security system estimates the existence of a security risk.

Performance module 110 may perform the remedial action in a variety of ways. In general, performance module 110 may transmit a notification or message to a user or administrator indicating the presence of the detected candidate security threat. Performance module 110 may transmit the notification by way of SHORT MESSAGE SERVICE, email, social network message, and/or voice mail. The notification may indicate to the user the potentiality that another client device is spoofing or impersonating the previous trusted access point. Similarly, the notification may notify the user that there is the potential for an attacker or intruder to snoop network traffic.

Additionally or alternatively, performance module 110 may increase the security risk score by adjusting the score toward an end of the scale or spectrum indicating the existence of a security threat. In some examples, performance module 110 may increase the security risk score in proportion to a value indicating a degree of dissimilarity between the initial information and the subsequent information. Moreover, in some examples, the security risk score may correspond to a score that is adjusted based on the detection of the potentially changed access point as merely one factor, from among a multitude of factors, used to adjust the security risk score to estimate a degree to which the security system predicts that a security threat is present. These other factors may include factors based on other security techniques that attempt to detect security threats based on one or more of network probing, wireless signal abnormality, results of traceroute commands, traffic sniffing, access point impersonation, and/or WI-FI network signal triangulation and/or geolocation information.

Notably, in the above examples, the remedial action corresponds to either warning the user and/or increasing the security risk score. In other examples, the remedial action may correspond to any additional or alternative action that a software security product may perform to protect a user from a candidate security threat detected according to step 308 of method 300. For example, the remedial action may include blocking the second network connection, preventing an attempt of the second network connection from succeeding, slowing or throttling the second network connection, quarantining or sandboxing one or more computer network resources, notifying the security vendor, sounding an alarm, notifying an administrator, prompting a user for an authorization override, and/or increasing a value or strength or magnitude of one or more other network security measures, such as password and/or firewall security measures. Additionally, performance module 110 may also react by performing a remedial action with respect to the first client device and/or the first client connection (e.g., in a manner parallel to any of the remedial actions described above for the second network connection) in cases where these are different than for the second client connection.

As explained above in connection with method 300 in FIG. 3, the disclosed systems and methods may improve the accuracy and usefulness of network security technology by notifying users, administrators, and/or security software programs of potential changes in wireless access points that may indicate that the wireless network is compromised. Even when the disclosed systems and methods do not provide a guaranteed assurance that the wireless access point has changed or that the network is truly compromised, the systems may nevertheless warn users of the potential danger and also adjust or increase corresponding security risk scores.

Figure 5:
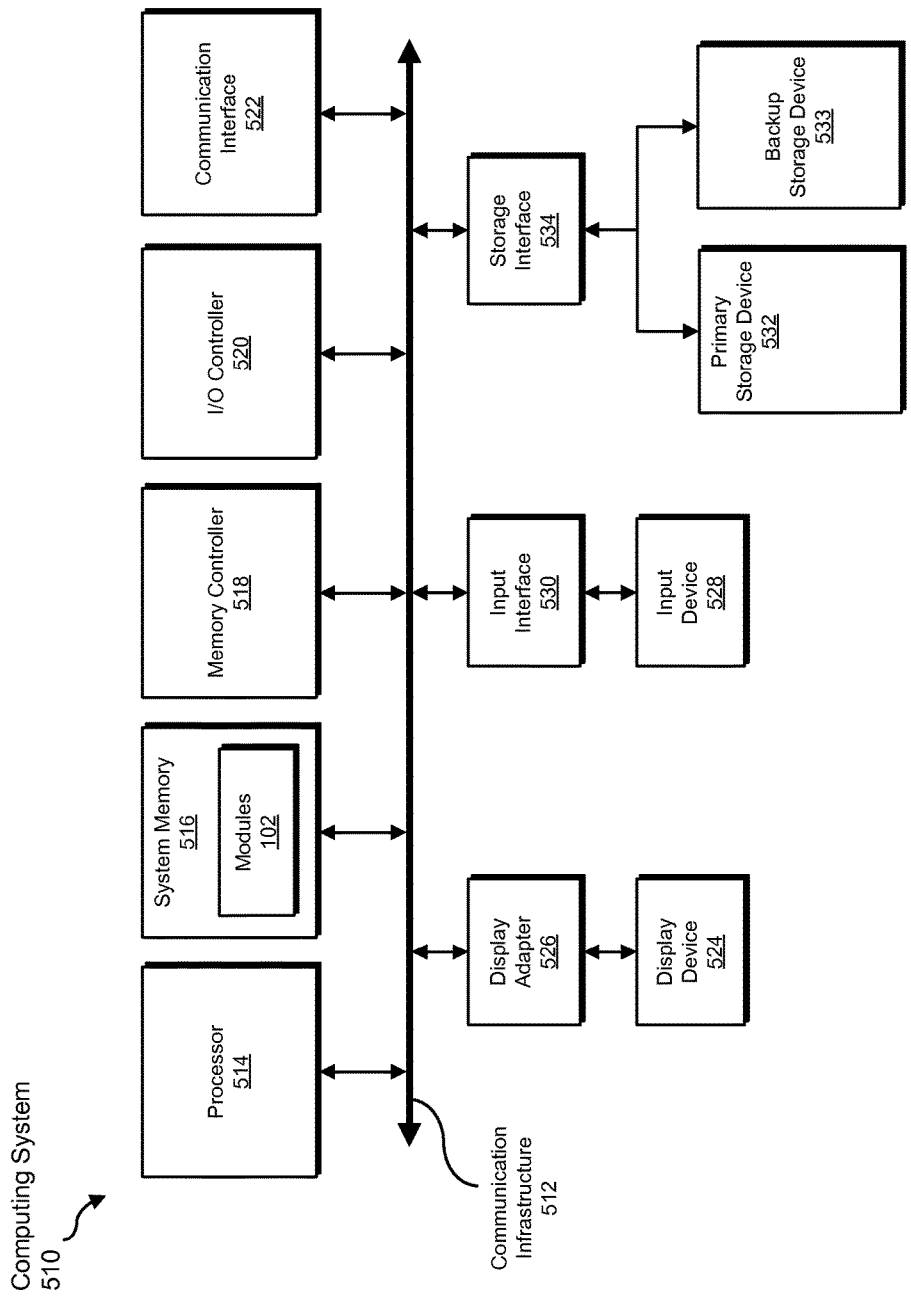
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
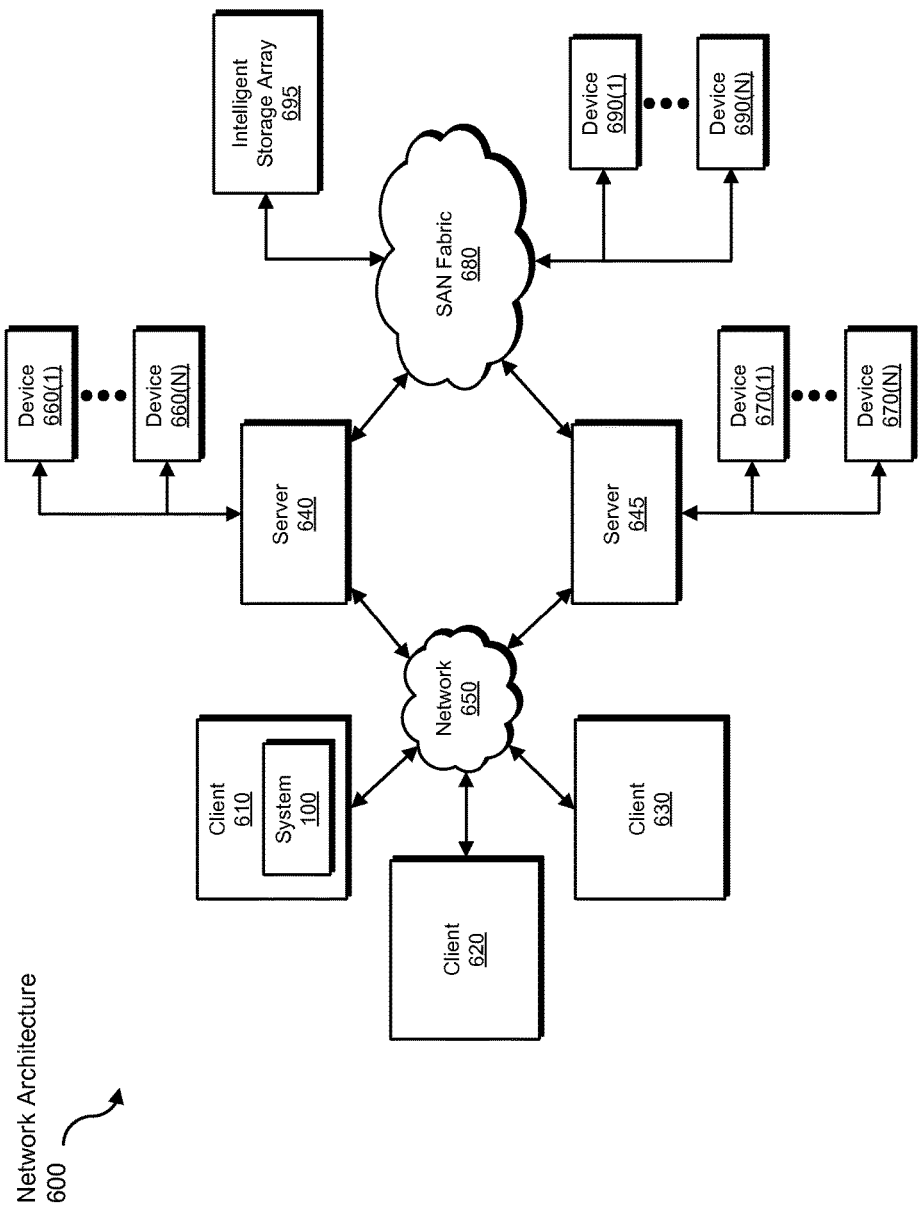
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for network security.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive access point identification information and/or security system state information to be transformed, transform one or more of these items of information, output a result of the transformation to a display or output device, use the result of the transformation to improve network security systems, and store the result of the transformation to a disk or other memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for network security, at least a portion of the method being performed by a computing device comprising at least one processor, the method comprising:
   obtaining initial information that at least partially identifies an initial access point for connecting to a network, the initial information comprising—an initial manufacturer identifier;
   after obtaining the initial information, obtaining from a centralized backend security server, subsequent information that comprises a subsequent manufacturer identifier and that at least partially identifies a subsequent access point for connecting to the same network, the subsequent manufacturer identifier having been initially obtained by a different client device than the computing device and uploaded by the different client device to the centralized backend security server of a software security product vendor for aggregating telemetry information from different client devices in a field of client devices corresponding to separate purchases of a security program;
   comparing, by the security program, the initial-manufacturer identifier that was obtained by the computing device and the subsequent manufacturer identifier that was initially obtained by the different client device than the computing device in an attempt to detect whether the initial access point and the subsequent access point are the same;
   detecting, based on the comparison, an indication that the initial access point and the subsequent access point are different; and
   performing, by the computing device in response to detecting the indication that the initial access point and the subsequent access point are different, a remedial action to protect a user, the remedial action comprising:
      warning the user by transmitting a message that indicates to the user that there is a potential for an intruder to snoop network traffic when connected to the initial access point; and
      preventing a successful attempt by the user to connect to the network through the initial access point.

2. The method of claim 1, wherein:
   the network comprises a wireless network; and
   the initial access point and the subsequent access point comprise wireless access points.

3. The method of claim 1, wherein obtaining the initial information that at least partially identifies the initial access point for connecting to the network further comprises interrogating the initial access point.

4. The method of claim 1, wherein detecting, based on the comparison, the indication that the initial access point and the subsequent access point are different comprises detecting an indication that an initial media access control address and a subsequent media access control address are different.

5. The method of claim 1, wherein detecting, based on the comparison, the indication that the initial access point and the subsequent access point are different comprises detecting an indication that a field of an initial network packet transmitted by the initial access point specifies a value that differs from the same field of a subsequent network packet transmitted by the subsequent access point.

6. The method of claim 5, wherein the field of the initial network packet and the field of the subsequent network packet are located at the data link layer of the open systems interconnection model.

7. The method of claim 5, wherein:
   the field specifies at least one hardware capability supported by a corresponding access point; and
   detecting, based on the comparison, the indication that the initial access point and the subsequent access point are different comprises detecting an indication that hardware capabilities supported by the initial access point and hardware capabilities supported by the subsequent access point are different.

8. The method of claim 1, wherein detecting, based on the comparison, the indication that the initial access point and the subsequent access point are different comprises detecting an indication that an identity of a wireless radio of the initial access point and an identity of a wireless radio of the subsequent access point are different.

9. The method of claim 1,
   further comprising the centralized backend security server indexing the telemetry information according to a key value that indicates a corresponding wireless network, the key value including at least one of a SERVICE SET IDENTIFIER and a password.

10. The method of claim 1, wherein the initial information is obtained at least in part from a web configuration homepage for configuring the initial access point.

11. A system for network security, the system comprising:
   an obtaining module, stored in memory of a computing device, that:
      obtains initial information that at least partially identifies an initial access point for connecting to a network, the initial information comprising an initial identifier;
      after obtaining the initial information, obtains from a centralized backend security server, subsequent information that comprises a subsequent manufacturer identifier and that at least partially identifies a subsequent access point for connecting to the same network, the subsequent manufacturer identifier having been initially obtained by a different client device than the computing device and uploaded by the different client device to the centralized backend security server of a software security product vendor for aggregating telemetry information from different client devices in a field of client devices corresponding to separate purchases of a security program;
   a comparison module, stored in the memory of the computing device, that compares, as part of the security program, the initial manufacturer identifier that was obtained by the computing device and the subsequent manufacturer identifier that was initially obtained by the different client device than the computing device in an attempt to detect whether the initial access point and the subsequent access point are the same;
   a detection module, stored in the memory of the computing device, that detects, based on the comparison, an indication that the initial access point and the subsequent access point are different;
   a performance module, stored in the memory of the computing device, that performs, as part of the security program in response to detecting the indication that the initial access point and the subsequent access point are different, a remedial action to protect a user, the remedial action comprising:
   warning the user by transmitting a message that indicates to the user that there is a potential for an intruder to snoop network traffic when connected to the initial access point; and
   preventing a successful attempt by the user to connect to the network through the initial access point; and
at least one physical processor configured to execute the obtaining module, the comparison module, the detection module, and the performance module.

12. The system of claim 11, wherein:
the network comprises a wireless network; and
the initial access point and the subsequent access point comprise wireless access points.

13. The system of claim 11, wherein the obtaining module obtains the initial information that at least partially identifies the initial access point for connecting to the network at least in part by interrogating the initial access point.

14. The system of claim 11, wherein the detection module detects, based on the comparison, the indication that the initial access point and the subsequent access point are different by detecting an indication that an initial media access control address and a subsequent media access control address are different.

15. The system of claim 11, wherein the detection module detects, based on the comparison, the indication that the initial access point and the subsequent access point are different by detecting an indication that a field of an initial network packet transmitted by the initial access point specifies a value that differs from the same field of a subsequent network packet transmitted by the subsequent access point.

16. The system of claim 15, wherein the field of the initial network packet and the field of the subsequent network packet are located at the data link layer of the open systems interconnection model.

17. The system of claim 15, wherein:
the field specifies at least one hardware capability supported by a corresponding access point; and
the detection module detects, based on the comparison, the indication that the initial access point and the subsequent access point are different by detecting an indication that hardware capabilities supported by the initial access point and hardware capabilities supported by the subsequent access point are different.

18. The system of claim 11, wherein the detection module detects, based on the comparison, the indication that the initial access point and the subsequent access point are different by detecting an indication that an identity of a wireless radio of the initial access point and an identity of a wireless radio of the subsequent access point are different.

19. The system of claim 11, wherein the centralized backend security server is configured to index the telemetry information according to a key value that indicates a corresponding wireless network, the key value including at least one of a SERVICE SET IDENTIFIER and a password.

20. A non-transitory computer-readable medium comprising one or more computer-readable instructions that, when executed by at least one processor of a computing device, cause the computing device to:
   obtain initial information that at least partially identifies an initial access point for connecting to a network, the initial information comprising an initial identifier;
   after obtaining the initial information, obtain from a centralized backend security server, subsequent information that comprises a subsequent manufacturer identifier and that at least partially identifies a subsequent access point for connecting to the same network, the subsequent manufacturer identifier having been initially obtained by a different client device than the computing device and uploaded by the different client device to the centralized backend security server of a software security product vendor for aggregating telemetry information from different client devices in a field of client devices corresponding to separate purchases of a security program;
   compare, by the security program, the initial manufacturer identifier that was obtained by the computing device and the subsequent manufacturer identifier that was initially obtained by the different client device than the computing device in an attempt to detect whether the initial access point and the subsequent access point are the same;
   detect, based on the comparison, an indication that the initial access point and the subsequent access point are different; and
   perform, by the computing device in response to detecting the indication that the initial access point and the subsequent access point are different, a remedial action to protect a user, the remedial action comprising:
   warning the user by transmitting a message that indicates to the user that there is a potential for an intruder to snoop network traffic when connected to the initial access point; and
   preventing a successful attempt by the user to connect to the network through the initial access point.

* * * * *